United States Patent
Qian et al.

(10) Patent No.: US 10,620,503 B2
(45) Date of Patent: Apr. 14, 2020

(54) PPSF FIBER-BASED BROADBAND POLARIZATION-ENTANGLED PHOTON SOURCE

(71) Applicant: OZ Optics Ltd., Ottawa, Ontario (CA)

(72) Inventors: Li Qian, Toronto (CA); Changjia Chen, Guangzhou (CN); Arash Riazi, Babol (IR); Eric Y. Zhu, North York (CA)

(73) Assignee: OZ OPTICS LTD., Ottawa, ON (CA)

( * ) Notice: Subject to any disclaimer, the term of this patent is extended or adjusted under 35 U.S.C. 154(b) by 0 days.

(21) Appl. No.: 16/106,599

(22) Filed: Aug. 21, 2018

(65) Prior Publication Data
US 2020/0041866 A1    Feb. 6, 2020

(30) Foreign Application Priority Data
Jul. 31, 2018   (CA) ...................................... 3012946

(51) Int. Cl.
*G02F 1/35*    (2006.01)
*G02F 1/365*   (2006.01)

(52) U.S. Cl.
CPC .......... *G02F 1/3501* (2013.01); *G02F 1/3526* (2013.01); *G02F 1/365* (2013.01); *G02F 2001/3503* (2013.01)

(58) Field of Classification Search
CPC ...... G02F 1/3501; G02F 1/3526; G02F 1/365; G02F 2001/3503
See application file for complete search history.

(56) References Cited

U.S. PATENT DOCUMENTS

| | | | | |
|---|---|---|---|---|
| 5,088,191 A | * | 2/1992 | Lazaro, Jr. | ......... H01R 13/5219 29/861 |
| 5,095,212 A | * | 3/1992 | Cook | ........................ G01J 1/58 250/458.1 |
| 5,107,226 A | * | 4/1992 | Pascaru | .................... H03L 7/26 331/3 |

(Continued)

OTHER PUBLICATIONS

Bedington, et al., "Progress in satellite quantum key distribution", Publisher: npj Quantum Information 3.1 (2017): 30.

(Continued)

*Primary Examiner* — Andrew Jordan
(74) *Attorney, Agent, or Firm* — David G. Woodral

(57) ABSTRACT

There is provided a fiber-based broadband polarization-entangled photon source. The polarization entangled photon pair source module comprises an optical fiber, a pump to couple light into the fiber and one or more suppression filters following the fiber. The optical fiber preferably is a periodically poled silica fiber and the pump is preferably a laser diode pump. The present invention relates to a compensation-free, alignment-free, diode-pumped, broadband, polarization-entangled photon source that is based on a low-birefringence fiber. It has an extremely simple configuration capitalizing on the compensation-free and direct generation capability of a low-birefringence fiber. The source has broad bandwidth, high-quality and polarization-entanglement. The present invention is compact, robust, low-power, low-cost, alignment-free and room-temperature operable, featuring a simple turn-key, plug-and-play operation.

19 Claims, 6 Drawing Sheets

(a) Components inside the compact polarization entangled photons source module

(56) References Cited

U.S. PATENT DOCUMENTS

| | | | | |
|---|---|---|---|---|
| 5,183,413 A | * | 2/1993 | Lazaro, Jr. | H01R 13/5219 439/281 |
| 5,769,668 A | * | 6/1998 | Tondreault | H01R 12/7005 439/326 |
| 6,052,393 A | * | 4/2000 | Islam | H01S 3/302 356/460 |
| 6,264,372 B1 | * | 7/2001 | Pianciola | G01M 11/33 385/147 |
| 6,369,928 B1 | * | 4/2002 | Mandella | G02B 21/0032 359/204.1 |
| 6,414,779 B1 | * | 7/2002 | Mandella | A61B 1/00183 359/201.1 |
| 6,522,444 B2 | * | 2/2003 | Mandella | A61B 1/00183 359/214.1 |
| 6,619,856 B1 | * | 9/2003 | Lampert | G02B 6/3812 385/59 |
| 6,666,705 B1 | * | 12/2003 | Lauruhn | H01R 12/7005 439/377 |
| 6,705,765 B2 | * | 3/2004 | Lampert | G02B 6/3812 385/77 |
| 6,744,939 B2 | * | 6/2004 | Lampert | G02B 6/3812 385/11 |
| 6,751,386 B2 | * | 6/2004 | Bonfrate | G02F 1/3558 385/122 |
| 6,831,776 B2 | * | 12/2004 | Bonfrate | G02F 1/3558 359/332 |
| 6,897,434 B1 | * | 5/2005 | Kumar | B82Y 10/00 250/227.18 |
| 7,373,059 B2 | * | 5/2008 | Spillane | B82Y 10/00 385/122 |
| 7,486,433 B2 | * | 2/2009 | Jarutis | B82Y 10/00 359/326 |
| 7,489,436 B1 | * | 2/2009 | Fiorentino | G02F 1/39 359/326 |
| 7,570,419 B2 | * | 8/2009 | Edamatsu | B82Y 10/00 359/326 |
| 7,639,953 B2 | * | 12/2009 | Spillane | B82Y 10/00 398/176 |
| 7,706,694 B2 | * | 4/2010 | Freeling | G06N 10/00 398/183 |
| 8,149,494 B1 | * | 4/2012 | Spence | G02B 27/12 359/288 |
| 8,222,623 B2 | * | 7/2012 | Trojek | G02F 1/3526 250/493.1 |
| 8,514,478 B1 | * | 8/2013 | Spence | G02B 27/12 359/288 |
| 8,519,358 B2 | * | 8/2013 | Ingber | G01N 21/0303 250/458.1 |
| 8,797,639 B2 | * | 8/2014 | McKinstrie | H04B 10/299 359/326 |
| 8,804,114 B2 | * | 8/2014 | Ingber | G01N 21/6452 356/246 |
| 8,921,826 B2 | * | 12/2014 | Hayat | B82Y 20/00 257/13 |
| 9,261,404 B2 | * | 2/2016 | Marbach | G01N 21/65 |
| 9,465,274 B1 | | 10/2016 | Soh | G02F 1/3536 |
| 9,470,847 B2 | * | 10/2016 | Grinderslev | G02B 6/3812 |
| 9,488,897 B2 | * | 11/2016 | Oshima | G02F 1/365 |
| 9,506,866 B2 | * | 11/2016 | Ingber | G01N 21/0303 |
| 9,581,541 B2 | * | 2/2017 | Ingber | G01N 21/6452 |
| 9,680,452 B1 | * | 6/2017 | Abdo | H03K 3/38 |
| 9,689,679 B2 | * | 6/2017 | Budker | G01C 19/58 |
| 9,720,437 B2 | * | 8/2017 | Gilbert | G11C 13/048 |
| 9,778,171 B2 | * | 10/2017 | Ingber | G01N 21/6452 |
| 9,952,482 B2 | * | 4/2018 | Rudolph | G02F 1/3526 |
| 10,073,036 B2 | * | 9/2018 | Ingber | G01N 21/0303 |
| 10,108,071 B2 | * | 10/2018 | Abdo | H03K 3/38 |
| 10,133,147 B2 | * | 11/2018 | Earl | G02F 1/39 |
| 10,175,554 B2 | * | 1/2019 | Grice | G02F 1/3501 |
| 10,175,556 B2 | * | 1/2019 | Reimer | B82Y 10/00 |
| 10,185,090 B2 | * | 1/2019 | Marchildon | G02B 6/122 |
| 2002/0114059 A1 | * | 8/2002 | Bonfrate | G02F 1/3558 359/332 |
| 2002/0131139 A1 | * | 9/2002 | Mandella | A61B 1/00183 359/214.1 |
| 2002/0150363 A1 | * | 10/2002 | Bonfrate | G02F 1/3558 385/122 |
| 2003/0215171 A1 | * | 11/2003 | Lampert | G02B 6/3812 385/11 |
| 2003/0215190 A1 | * | 11/2003 | Lampert | G02B 6/3812 385/77 |
| 2006/0029342 A1 | * | 2/2006 | Tadakuma | G01M 11/31 385/122 |
| 2007/0035722 A1 | * | 2/2007 | Tadakuma | G01M 11/31 356/73.1 |
| 2008/0075410 A1 | * | 3/2008 | Spillane | B82Y 10/00 385/122 |
| 2009/0135870 A1 | * | 5/2009 | Hayat | B82Y 20/00 372/44.01 |
| 2009/0268276 A1 | | 10/2009 | Lee et al. | |
| 2010/0111541 A1 | * | 5/2010 | Trojek | G02F 1/3526 398/152 |
| 2010/0208334 A1 | * | 8/2010 | Kanter | G02F 1/3526 359/330 |
| 2010/0309469 A1 | | 12/2010 | Kanter et al. | |
| 2011/0042582 A1 | * | 2/2011 | Ingber | G01N 21/0303 250/458.1 |
| 2011/0093207 A1 | * | 4/2011 | Ingber | B04B 9/14 702/19 |
| 2012/0105837 A1 | * | 5/2012 | Ingber | G01N 21/6452 356/246 |
| 2012/0196271 A1 | * | 8/2012 | Ingber | G01N 21/07 435/3 |
| 2013/0155491 A1 | * | 6/2013 | McKinstrie | H04B 10/299 359/326 |
| 2013/0301094 A1 | * | 11/2013 | Gilbert | G11C 13/048 359/107 |
| 2014/0170691 A1 | * | 6/2014 | Ingber | G01N 21/0303 435/29 |
| 2014/0354989 A1 | * | 12/2014 | Marbach | G01N 21/65 356/301 |
| 2015/0029501 A1 | * | 1/2015 | Ingber | G01N 21/6452 356/244 |
| 2015/0083932 A1 | * | 3/2015 | Rizo | A61B 5/0071 250/458.1 |
| 2015/0085348 A1 | * | 3/2015 | Mildren | H01S 3/30 359/327 |
| 2015/0090033 A1 | * | 4/2015 | Budker | G01C 19/58 73/504.05 |
| 2016/0202428 A1 | * | 7/2016 | Grinderslev | G02B 6/3812 385/11 |
| 2017/0052427 A1 | * | 2/2017 | Earl | G02F 1/39 |
| 2017/0074798 A1 | * | 3/2017 | Ingber | G01N 21/0303 |
| 2017/0075190 A1 | * | 3/2017 | Rudolph | G02F 1/3526 |
| 2017/0102316 A1 | * | 4/2017 | Ingber | G01N 21/6452 |
| 2018/0081255 A1 | * | 3/2018 | Reimer | B82Y 10/00 |
| 2018/0107092 A1 | * | 4/2018 | Abdo | H03K 3/38 |
| 2018/0231868 A1 | * | 8/2018 | Grice | G02F 1/3501 |
| 2018/0292728 A1 | * | 10/2018 | Earl | G02F 1/3526 |
| 2018/0335683 A1 | * | 11/2018 | Abdo | H03K 3/38 |
| 2018/0348135 A1 | * | 12/2018 | Ingber | G01N 21/0303 |

OTHER PUBLICATIONS

Chen, Changjia et al, "Compensation-free broadband entangled photon pair sources", Publisher: Optics Express 25, pp. 22667-22678, Sep. 8, 2017.

L.G. Helt, et al., "Proposal for in-fiber generation of telecom-band polarization-entangled photon pairs using a periodically poled fiber", Optics Letter, 34, Issue 14, pp. 2138-2140, 2009.

Yin, et al., "Satellite-based entanglement distribution over 1200 kilometers", Publisher: Science 356.6343 (2017): 1140-1144.

E. Y. Zhu, et al,, "Poled-fiber source of broadband polarization-entangled photon pairs", Publisher: Opt. Lett. 38, pp. 4397-4400, 2013.

(56) References Cited

OTHER PUBLICATIONS

Zhu, et al., "Multi-party agile quantum key distribution network with a broadband fiber-based entangled source", Publisher: arXiv preprint arXiv:1506.03896 (2015).

Zhu, Eric Y., et al., "Direct generation of polarization-entangled photon pairs in a poled fiber", Publisher: Physical review letters 108.21 (2012): 213902.

* cited by examiner (a) Components inside the compact polarization entangled photons source module (a) Components inside the compact polarization entangled photons source module

PPSF FIBER-BASED BROADBAND POLARIZATION-ENTANGLED PHOTON SOURCE

CROSS-REFERENCE TO RELATED CASES

This application claims the benefit of Canadian patent application Serial No. 3,012,946, filed on Jul. 31, 2018, and incorporates such application by reference into this disclosure as if fully set out at this point.

FIELD OF THE INVENTION

There is provided a fiber-based broadband polarization-entangled photon source having a simple configuration. The present invention is compact, robust, low-power, low-cost, alignment-free and room-temperature operable, featuring a simple turn-key, plug-and-play operation.

BACKGROUND OF THE INVENTION

Quantum technology is on the verge of becoming the next transformative discipline. Quantum entangled sources, i.e. sources that emit entangled particles, are a core quantum technology. Entangled sources have one property that no classical source has, that is quantum entanglement. Once described by Einstein as "spooky action at a distance", entanglement is now an extremely powerful resource for quantum computing, quantum communication and quantum sensing. Entangled photons are pairs of photons exhibiting quantum correlations which can be harnessed to perform more efficient computation, higher resolution imaging, or secure cryptographic key distribution. Different types of entanglement exist, such as position-time entanglement, quadrature entanglement, frequency entanglement and modal entanglement. Polarization-entanglement is by far the most widely encountered and arguably the most promising for practical applications, because polarization correlation is easy to measure and verify, without requiring stable interferometers. Moreover, telecom-wavelength entangled photon sources are particularly useful, because their wavelengths correspond to the low-loss region of the existing telecom fiber, enabling easy distribution of entanglement over long distances, which is essential to distributed quantum computing and quantum cryptography.

While there are a number of technologies that can produce polarization-entangled photon pairs in the telecom wavelength region, they tend to be bulky and complex. The quantum industry cannot survive on fragile, bulky and expensive entangled sources that work only in highly controlled laboratory environments. The more robust, compact, efficient, and affordable the entangled sources become, the sooner quantum technology will flourish.

Polarization-entangled EPR (Einstein-Podolsky-Rosen) pairs can be generated through spontaneous parametric down conversion (SPDC) in nonlinear optical media, typically birefringent crystals or waveguides that have a large second-order nonlinearity, $\chi(2)$. Pump photons traveling in the nonlinear medium have a small probability of decaying into two correlated daughter photons (the signal and the idler). Momentum conservation (i.e., phase matching) is satisfied either through choosing a particular crystal orientation, or through quasi-phase matching (QPM), attainable with a periodic structure. Polarization entanglement of the two daughter photons is either inherent in the SPDC process or can be achieved through post selection or erasure of distinguishability.

While crystals and waveguides with large $\chi(2)$ can yield high-flux photon pairs, the coupling efficiency into a fibre is poor. They also require bulky optical elements and precision alignment. Fibre-based photon pair sources in the telecom wavelength region are desirable as generation and transport of photon pairs can then be done seamlessly in an all-fiber system, eliminating bulky optics and alignment.

However, conventional fibres do not exhibit 2nd-order nonlinearity ($\chi(2)=0$) due to glass symmetry. Prior work on fiber-based polarization-entangled photon pairs had been limited to using third-order nonlinearity, $\chi(3)$, via the spontaneous four-wave-mixing (SFWM) process, involving two pump photons having nearly the same wavelength (near degeneracy) as those of the signal and the idler in the telecom band.

Major disadvantages of the SFWM approach are:

(1) Due to the weak $\chi(3)$ in fibre, typically very long fibres are required (e.g., 300 m of DSF); in some specialty fibers (such has photonics crystal fibers), high nonlinearity can be achieved, but the fiber fabrication process is complex and such photonic crystal fibers are expensive.

(2) Operating near degeneracy requires the suppression of Raman-scattered photons as they spectrally overlap with the signal and the idler. Raman suppression is achieved by cooling the fibre in either liquid nitrogen or liquid helium, but residual Raman noise is still a major limitation to the entanglement quality of the source;

(3) The $\chi(3)$ tensor of silica is such that the photon pairs have the same polarization as the pump, and therefore are not polarization-entangled. Additional steps are required to convert them into polarization-entangled pairs, adding more complexity and cost.

These disadvantages largely diminished the attractiveness of using fibre, as the overall system would still be bulky and costly.

A further observation is that in the majority of the experimentally demonstrated systems that produce polarization-entangled photon pairs, the birefringence of the nonlinear medium (be it a crystal, a waveguide, or a polarization-maintaining fiber) is very large, leading to distinguishability due to polarization-dependent differential group delay (DGD). This DGD must be compensated to obtain high quality polarization entanglement, introducing an additional degree of complexity.

Although progress has been made in the design of bulky nonlinear crystals or waveguides, challenges remain. Operation and delicate alignment in free-space and bulk optics is challenging for infield applications. In addition, due to the large group birefringence in nonlinear crystals, temporal compensation is always needed to achieve polarization entanglement. One has to use interferometer, or an additional birefringent crystal, or a pre-compensator for pump, to eliminate the temporal distinguishability in the birefringent biphoton source. Such requirements increase the complexity and reduce the robustness of an entangled photon source.

An initial proposal of using periodically poled fiber for polarization-entangled photon generation was published in L. G. Helt et al., *Proposal for in-fiber generation of telecom-band polarization-entangled photon pairs using a periodically poled fiber*, Optics Letter, 34, Issue 14, pp. 2138-2140, 2009.

In 2012, the direct entangle generation was experimentally demonstrated using a fibre without any compensation or erasure of distinguishability; see for example Zhu, Eric Y., et al. "*Direct generation of polarization-entangled photon pairs in a poled fiber.*" Physical review letters 108.21 (2012): 213902.

The following article discusses broadband emission of the source: E. Y. Zhu, et al, "*Poled-fiber source of broadband polarization-entangled photon pairs*," Opt. Lett. 38, pp. 4397-4400, 2013.

The following article discusses compensation-free broadband polarization entanglement generation achieved in a periodically poled fiber: Chen, Changjia et al., *Compensation free broadband entangled photon pair sources*, Optics Express 25, pp. 22667-22678, Sep. 8, 2017. This reference is incorporated herein by reference in its entirety.

SUMMARY OF THE INVENTION

The present invention relates to a compensation-free, alignment-free, diode-pumped, broadband, polarization-entangled photon source that is based on a low-birefringence fiber. One aspect of the present invention uses a periodically poled silica fiber (PPSF) in a polarization entangled photon source for solving some of the problems associated with prior known solutions. The all-fiber-based optical structure grants strong robustness against environmental perturbation. Compared to the free space bulk optics, no spatial alignment is required in PPSF source. It can be steadily operating at room temperature. Taking advantage of a negligible group birefringence, PPSF sources are able to generate high quality and broadband entanglement over 80 nm bandwidth, which is desirable in applications such as broadband quantum sensing and multi-channel quantum communication. Moreover, it has been shown experimentally and theoretically that no additional temporal compensation is needed in PPSF-based sources. Thus, the structure of the PPSF-based source is extremely simple and compact.

BRIEF DESCRIPTION OF THE DRAWINGS

The invention will be better understood with reference to the following drawings showing exemplary embodiments in which:

FIG. 1 (b) shows an exemplary quantum state tomography (QST) setup for characterization of polarization entanglement, including wavelength splitters (L/C band WDMs) for separation of signal/idler photons, polarization analyzers (PAs) and a pair of single-photon detectors (SPDs). Each PA consists of an achromatic half-(HWP) and quarter wave plate (QWP) and a polarizer Pol).

FIG. 1 (c) shows an exemplary fiber spectrometer setup, which includes a spool of 20 km SMF-28, a fiber 50/50 beamsplitter for telecom-band and a pair of SPDs.

FIG. 1 (d) shows an exemplary coincidence-to-accidental stability test setup, including a set of standard fiber-CWDMs centering at 1550 nm and 1570 nm with 16 nm FHWM for separation of biphotons at a higher pump power.

FIG. 4. (b) shows a typical coincidence histogram example randomly selected from the 10 hours test, demonstrating around $1.7 \times 10^4$ pairs/min coincidence counts in detection.

DETAILED DESCRIPTION OF THE PREFERRED EMBODIMENTS

In one aspect of the present invention, there is provided a weakly birefringent periodically-poled fiber as a nonlinear medium, pumped by a narrow-band, linearly-polarized laser (which can optionally be a fiber-pigtailed diode laser), and followed by spectral filters that eliminate the pump photons as well as fluorescence noise photons.

Figure 5:
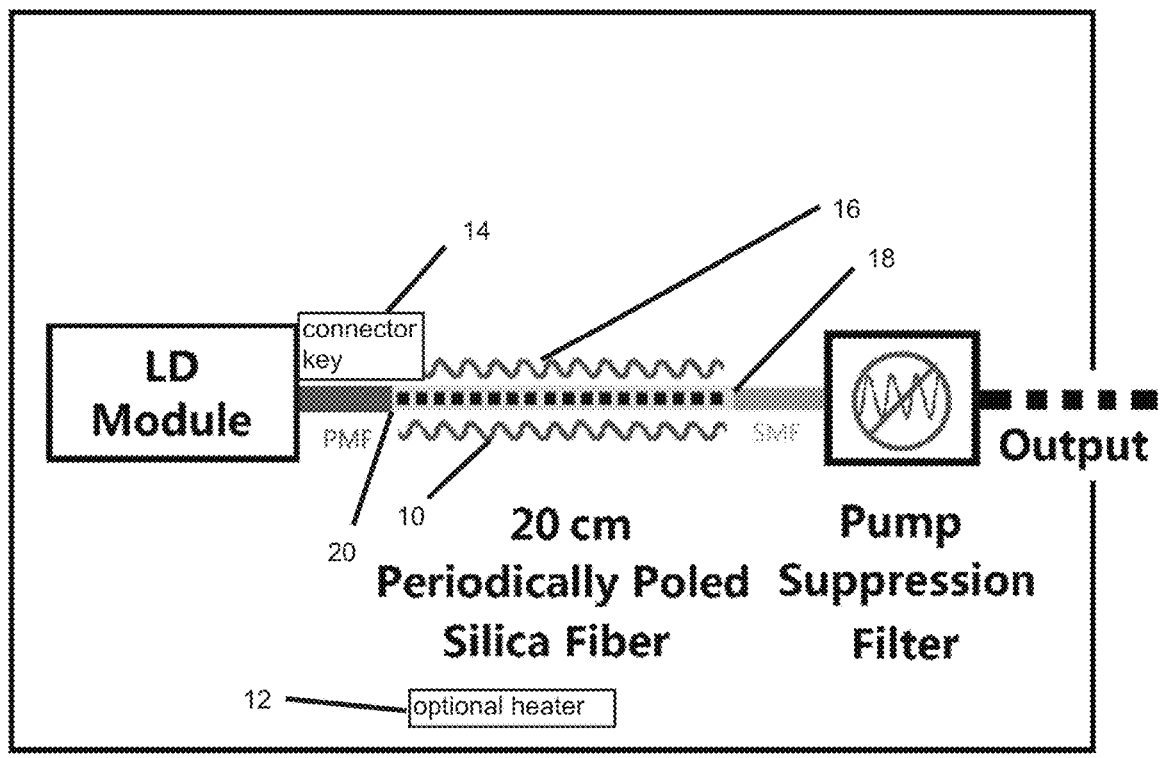
FIG. 5 shows the PPSF-based polarization entangled photon pair source module of FIG. 1a, including an optional heater and optional connector key.
Figure 6:
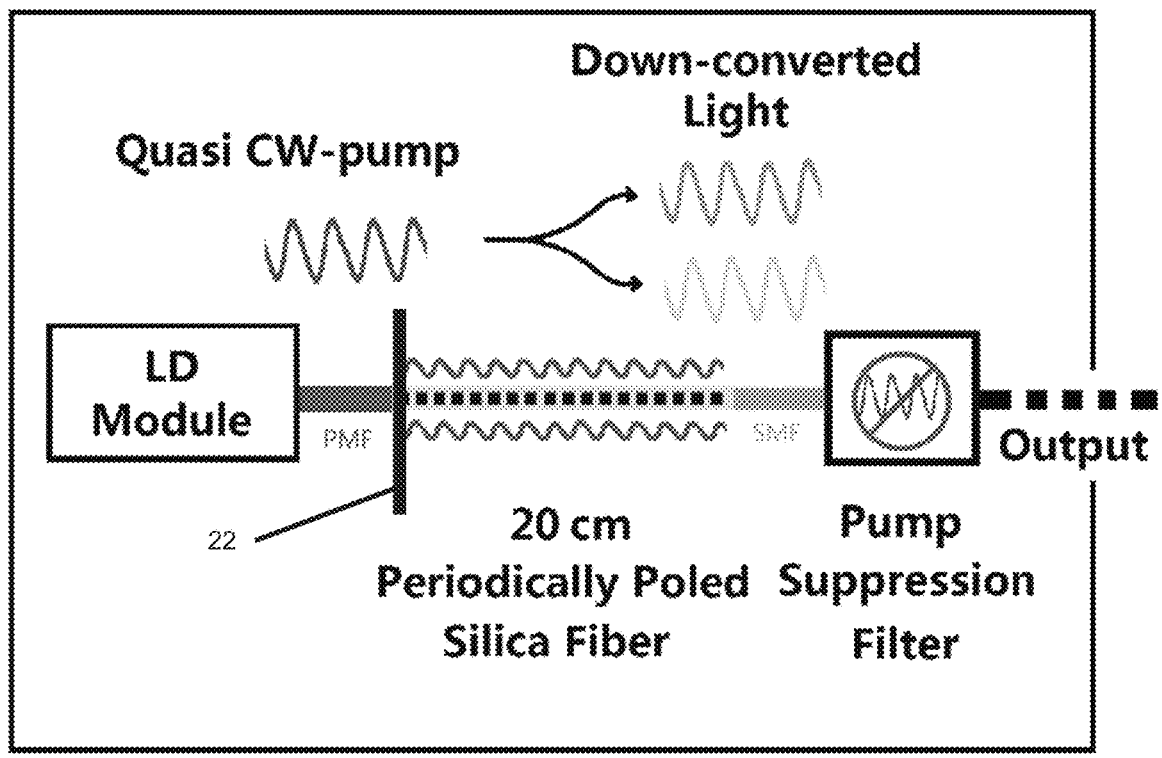
FIG. 6 shows the PPSF-based polarization entangled photon pair source module of FIG. 1a, including an optional fiber Bragg grating.

In a further aspect, the nonlinear fiber can be heated with an optional heater 12, shown in FIG. 5, to stabilize its phase matching wavelength or alter its phase matching bandwidth depending on the available pump wavelength and quasi-phase matching period.

The nonlinear fiber is weakly birefringent and has two defined polarization axes which can be aligned during splicing to a polarization-maintaining fiber from the pump. In one embodiment, it can also be connectorized with the connector key 14, shown in FIG. 5, aligned to one of its polarization axes. This assists in alignment free operation once the periodically-poled fiber is spliced or connectorized.

The low group birefringence of the nonlinear fiber allows the generation of polarization-entangled photon pairs directly, while the birefringence is sufficiently low that high-concurrence entanglement can be obtained over a large bandwidth without compensation. Details are discussed in Chen, Changjia et al., *Compensation free broadband entangled photon pair sources*, Optics Express 25, pp. 22667-22678, Sep. 18, 2017, and this reference is incorporated herein by reference.

The present invention features an extremely simple configuration capitalizing on the compensation-free and direct generation capability of a low-birefringence fiber. The present invention employs a broad bandwidth, high-quality polarization-entanglement. The source is also a hyper-entangled source in the sense that the photon pairs are entangled in both polarization- and in-spectral degree of freedom.

The present invention has several advantages such as being compact, robust, low-power, low-cost, alignment-free and room-temperature operable, featuring a simple turn-key, plug-and-play operation. These features are due to many aspects. For starters, the present invention is based on an induced second nonlinearity of the optical fiber that ensures much shorter nonlinear interaction length. In one aspect, the present invention relies on type II phase matching to generate polarization-entangled photons directly. In a further aspect the present invention relies on weak group birefringence such that no compensation or erasure of distinguishability is necessary. It is single-mode-fiber based so no beam alignment is necessary. The nonlinear fiber can be spliced and/or connectorized with polarization axis alignment such that no further polarization alignment is necessary once the nonlinear fiber is spliced or connectorized. It takes advantage of the mature telecom fiber technologies and uses mostly low-cost components widely available in the telecom industry.

The present invention has further advantages over the known prior solutions. Previous technologies that were based on crystals and waveguides (not fiber-based) rely on fiber-to-waveguide coupling. Elimination of the fiber coupling makes the present invention robust, alignment-free, reduces loss and lowers costs. Some previous fiber-based technologies rely on cryogenic cooling to reduce Raman noise. Conversely, the present invention does not need cryogenic cooling. In addition, most other technologies use either an interferometer configuration or compensator(s) to erase distinguishability, resulting in system complexity. Conversely, the present invention generates it directly (using type II phase matching) and without compensation (due to low group birefringence).

Variations to the present invention exist. For example, the present invention can use other types of nonlinear fibers, not necessarily poled fibers, provided the fiber (1) has sufficiently large second-order nonlinearity, (2) can be type II phase matched (or quasi-phase matched) for the desirable pump, signal and idler wavelengths; and (3) has low birefringence (specifically low group birefringence such that the polarization walk off is negligible compared to spectral walk-off over the desirable signal/idler bandwidth). In other examples, the pump can be a different type, such as continuous wave, Q-switched, mode-locked, or otherwise pulsed, provided the pump is linearly polarized and has sufficient power within the phase-matching bandwidth. The pump can optionally be replaced by a wavelength tunable laser to excite other types of phase matching (such as type 0, type I, etc.) This would allow correlated photon pair generation for better brightness.

In other variations, the nonlinear fiber can be placed in a resonant cavity 10, for example formed by fiber gratings 16, to obtain high spectral brightness or more desirable spectral properties. In other alternatives, various stabilization schemes may be employed, such as pump wavelength stabilization, temperature stabilization for the entire module, etc. Other variations include using filters inside the module to separate signal and idler photons or using spectral filtering/shaping of any kind inside the module on the signal and idler spectra.

The present invention preferably uses diode pumping. In order to enable an in-field robust quantum operation, a compact and stable system is desired. Due to the compactness and stability of a laser diode, it is more favorable for practical quantum application. For a less than 1 micron small size compact entangled photon source, laser diode is preferred. References respecting diode pumping can be found in Bedington, Robert, Juan Miguel Arrazola, and Alexander Ling. *"Progress in satellite quantum key distribution."* npj Quantum Information 3.1 (2017): 30, and Yin, Juan, et al. *"Satellite-based entanglement distribution over 1200 kilometers."* Science 356.6343 (2017): 1140-1144.

Figure 1:
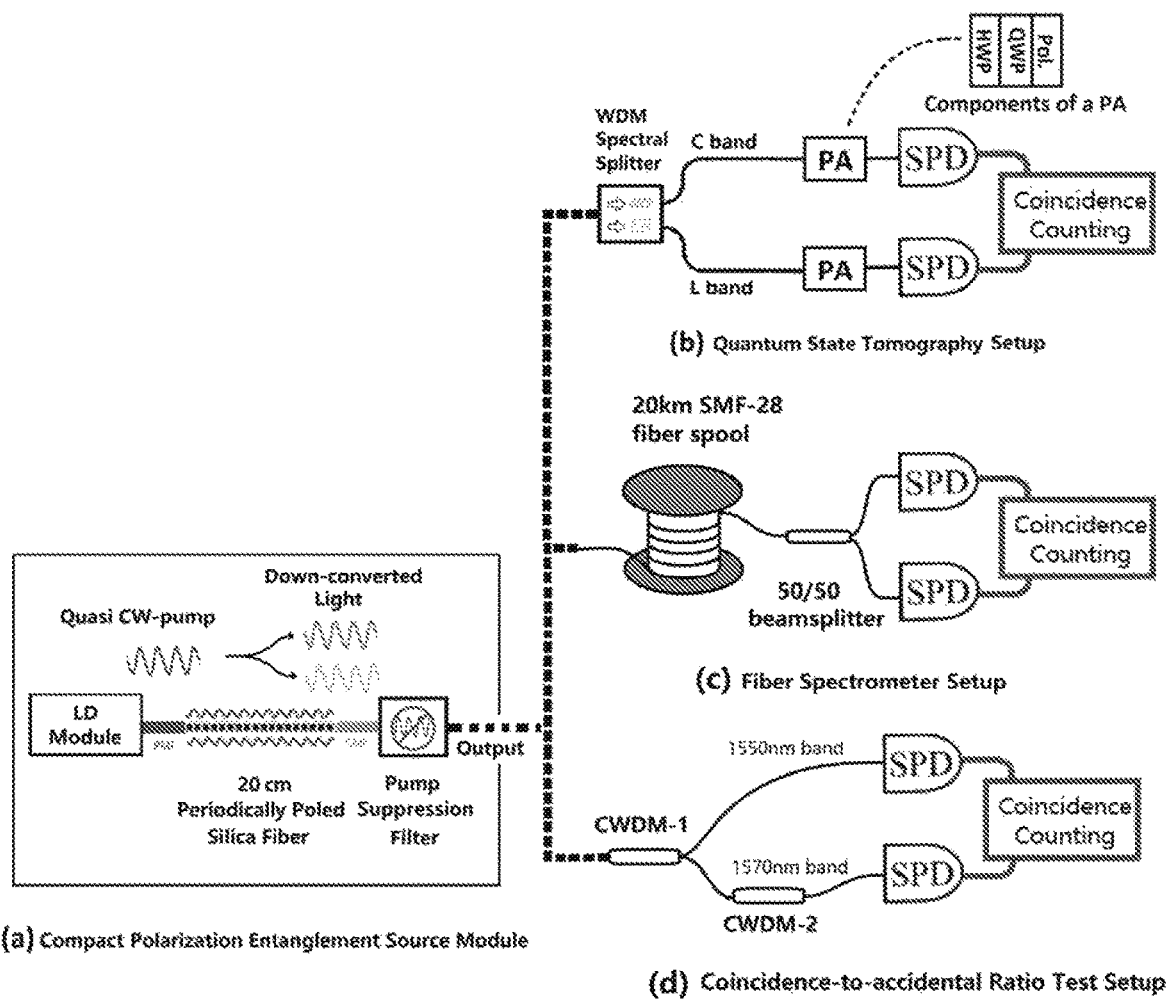
FIG. 1. (a) shows a PPSF-based polarization entangled photon pair source module including a polarization maintaining fiber pigtailed laser diode, a PPSF, and a set of fiber pigtailed pump suppression filters with a 3D design illustration shown in the top figure.

One embodiment of the packaged entanglement source setup is shown in FIG. 1(*a*) using a periodically poled silica fiber. Thanks to the compensation-free nature of a PPSF polarization source, the device has the least components and simplest structure. In this embodiment, a low-cost fiber-coupled Fabry-Perot CW laser diode module (OZ-1000, Ozoptics Ltd.) at 782.9 nm with up to 30 mW maximal power and <0.2 nm bandwidth linearly polarized output at the polarization maintaining fiber (PMF) pigtail 20 is used as a pump. Its wavelength is preset to match the type-II peak of the PPSF. The PMF output of the laser diode module is then spliced to the input of the 20 cm-long PPSF, which has a x (2)≈0.09 pm/V. The PMF splicing to the PPSF aligns its fast axis with "V" axis of the PPSF to ensure efficient type-II SPDC down conversion, in which a "V" pump photon is downconverted to a pair of entangled "H" and "V" photons. (The "H" axis of the PPSF is defined by the electric poling field). As the degeneracy wavelength is set at around 1565.8 nm, the generated broadband polarization entangled can be conveniently split by L/C band wavelength-division multiplexer for practical quantum applications. Note, due to the spectral separation of type-0 and type-II peaks, precise polarization alignment is not required of PMF-PPSF splice, as any misalignment in the splice only leads to a drop in pump efficiency instead of entanglement quality. Without any post compensation needed, the PPSF output is thus directly spliced to single mode fiber (SMF) pigtail 18 of a pump suppression filter set, which provides >110 dB of suppression to the pump light.

The exemplary components shown in FIG. 1 provide a polarization entanglement source with great stability, compactness and robustness. Because of the all-fiber structure, no alignment from the users is required. It can easily be fit into a 13.9"L*16.8"W*6.8"H (3U) enclosure with lots of empty space, as illustrated in the top figure of FIG. 1(*a*). Its size can be further optimized by better design and using a smaller enclosure, for example, a shoe-box-size 1U case.

In a further variation, a fibre Bragg grating (FBG) 22 can be provided at the output of the pump. The power reflectivity profile of the FBG can be designed to reflect the desired pump wavelength in order to stabilize the pump wavelength. A fiber Bragg grating (FBG) can be written, spliced or connected to the output fiber of the pigtailed pump laser diode. As a result, an additional optical feedback forces the laser diode to emit light and operate at a wavelength within the reflection bandwidth of that FBG. Consequently, the wavelength of the pump laser will be stabilized and locked to the center of the reflection bandwidth curve of the FBG and hence, the operating wavelength becomes impermeable to the instabilities and thermal noise of the pump laser diode. The spectral bandwidth of the FBG can also be fixed by using an active thermoelectric cooler to maintain its center wavelength as well as the operating wavelength of the pump laser diode. Also, this may reduce the linewidth of the pump laser diode.

The direct generation of polarization entanglement via type-II SPDC process produces bipartite Bell states. The state in terms of frequency can be written as:

$$|\Phi\rangle \propto \iint [|H_s V_s\rangle + \exp(i^*\phi(\omega_s, \omega_i))^* |V_s H_i\rangle] d\omega_s d\omega_i$$

The subscripts s,i denote signal and idler downconverted photons respectively. $\phi(\omega_s, \omega_i)$ is the phase that depends on frequency. The frequency dependence of phase might come from the birefringence and dispersion of the non-linear medium itself or the compensator, for example, the beam-splitter in interferometric compensator and the post compensation crystal. In the case of narrowband filtering or direct narrowband polarization entanglement generation, the frequency-dependent phase should not be a problem since it can be approximated by a constant in a small bandwidth region. However, when it comes to broadband generation over several THz, the phase term $\phi(\omega_s, \omega_i)$ variation becomes significant. In the presence of this phase, the ensemble average of state Eq. (1) over a relative broad spectrum will lead to significant degradation of entanglement and even turn out to be a mixed state. It has been demonstrated that the polarization entanglement in PPSF with narrowband filtering at different wavelength theoretically shows that the phase is nearly constant over the whole bandwidth. The present invention further demonstrates the genuine broadband polarization entanglement in a compact PPSF source using broad-band commercial L/C band WDMs as biphoton splitters.

Figure 2:
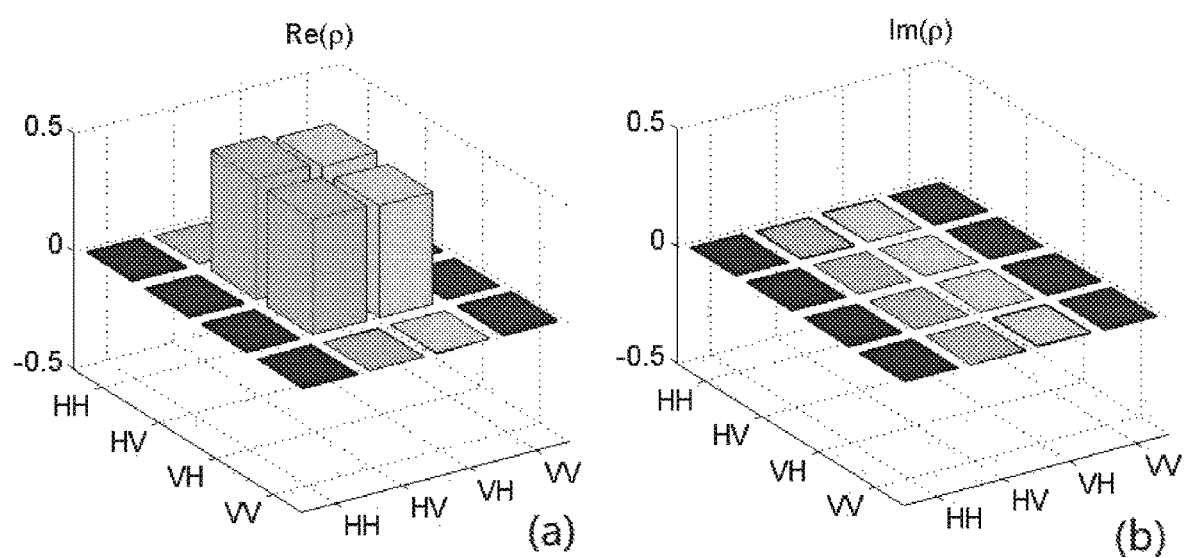
FIG. 2. (a) and (b) show real and imaginary parts of a density matrix measured from QST, showing that a concurrence of 0.966_+/−0.015 and a fidelity to $|\Psi+\rangle$ is obtained.

When the bandwidth of generated entangled biphotons is narrow, the phase and amplitude difference between $f_-(\omega_s, \omega_i)$ and $f_+(\omega_s, \omega_i)$ in Eq. (1) is trivial, since it can be approximated as a constant in a small range. Even in the case of broadband generation over several THz, the ensemble average of state Eq. (1) over a broad spectrum for the PPSF source still maintains high polarization-entanglement quality due to its low group birefringence. To demonstrate the genuine broadband nature of the source, there can be performed quantum state tomography (QST) (FIG. 1(b)) using a commercial broadband L/C band splitter to separate the signal and idler into C (1530-1565 nm) and L (1565-1625 nm) bands. The effective spectral detection window is ~70 nm (corresponding to the C band bandwidth, which is narrower). A pair of polarization analyzers and single photon detectors (IDQ-220, 20% detection efficiency at 1550 nm) are used for coincidence measurements. As the L/C band splitter does not have its filter boundary exactly matching the degeneracy wavelength, some degradation in the measured concurrence/fidelity results. In spite of this, the measured reduced density matrix (the frequency dependence over the spectral detection window is traced over) (FIGS. 2(a) and (b)) yields a high concurrence of 0.966±0.015 and a high fidelity to $|\Psi^+\rangle$ of 98.1±0.8% without subtraction of the background.

Figure 3:
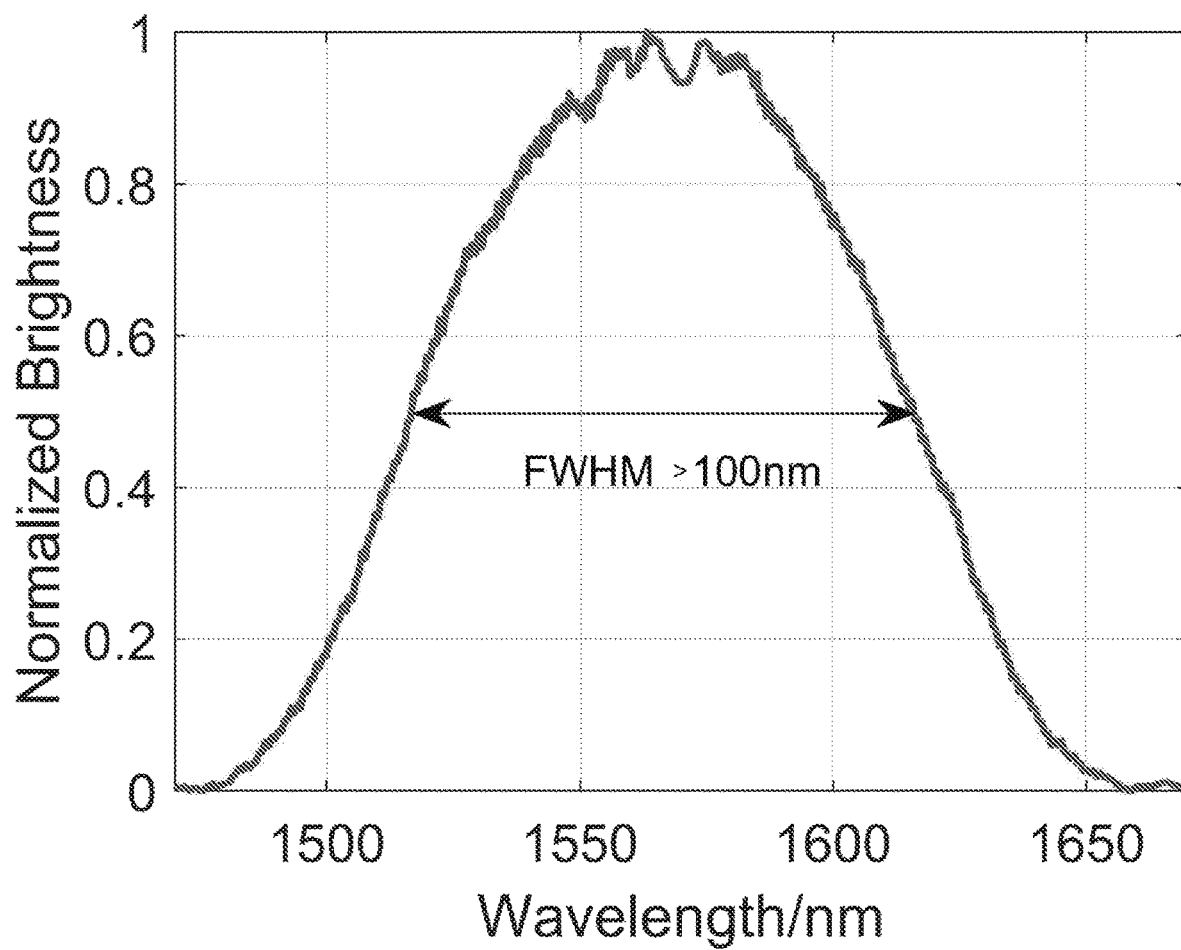
FIG. 3. shows a biphoton spectrum of the PPSF-based compact entanglement source measured from a fiber spectrometer, with accidentals subtracted from the spectrum.

Moreover, the spectral property of the source can be characterized using a fiber spectrometer. Details of this type of spectral characterization can be found for example in Zhu, E. Y., et al. *"Multi-party agile quantum key distribution network with a broadband fiber-based entangled source."* arXiv preprint arXiv:1506.03896 (2015). An exemplary spectrometer setup is shown in FIG. 1(c). The biphotons coming out from the compact source first go through a 20 km Corning SMF-28 fiber spool. The biphotons are temporally dispersed due to the chromatic dispersion. With a known dispersion of the fiber as function of frequency, the delay of the arrival time between the frequency correlated biphotons can be related to spectrum. The dispersive medium is then followed by a 50/50 polarization insensitive fiber beamsplitter. Note that compared to the finite bandwidth spectral filters, the beamsplitter scheme can cover the whole spectrum and thus gives a more complete spectral information. The post-processed temporal-to-spectral mapping of the coincidence measurement results in a biphoton spectrum with accidentals subtracted as shown in FIG. 3. A FWHM bandwidth of 101 nm is thus determined.

Figure 4:
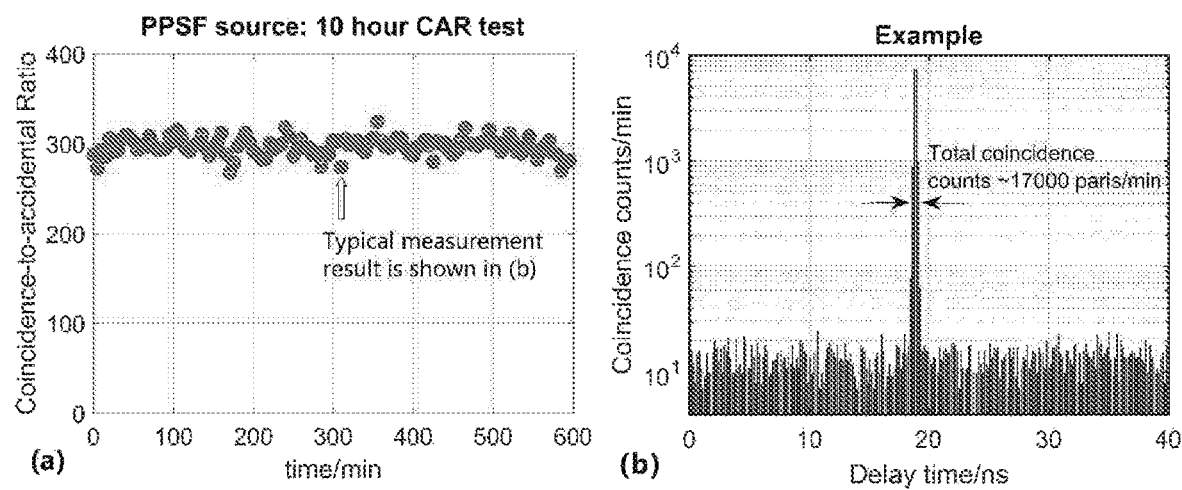
FIG. 4. (a) shows coincidence-to-accidental ratio (CAR) in 10 hours using spectral filters set with effective bandwidth of 4.8 nm under a pump power of 9 mW.

To demonstrate the operation stability of the source, the coincidence-to-accidental (CAR) ratio can be continually measured over a 10 hour period without any additional control of environmental factors. The CAR measurement was performed at a pump power of ~9 mW. At this pump power, the generation rate is so high that the detectors are saturated if L/C band splitter is used. The present invention preferably uses a set of narrower bandwidth spectral filters for demonstration, as shown in example FIG. 1(d). A pair of standard CWDM filters which are centered at 1550 nm and 1570 nm with 16 nm bandwidth respectively were used as splitter. Because the filters are not conjugated exactly with regard to the degeneracy wavelength, the effective spectral window that coincidence was obtained is 4.4 nm. Under a temperature condition of 21.0±3.0° C., the CAR maintained around 300, exhibiting excellent low-noise operation stability, as demonstrated in FIG. 4. Note, the CAR would be even much higher (estimated to be >3000) if a pair of conjugate frequency filters was used. A typical coincidence histogram in this experimental setup is shown in FIG. 4(b), indicating a detection rate of 290 pairs/s, along with single photon counts of $4*10^4$/s (IDQ-220, deadtime 15 μs, detection efficiency 20%). The loss in the CWDM filter sets is measured to be around 2 dB. A total generation rate at the output of the source is thus estimated to be $9*10^5$ pairs/s. The generation rate can be maximized up to $3*10^6$ pairs/s by increasing the pump power.

The performance of the source can be further improved. On one hand, because of the low-noise nature of the PPSF-based source, the generation rate can always be increased by higher power pumping, without losing entanglement quality. On the other hand, the in-source loss at present is large but can be greatly improved in the future. For example, the PMF-PPSF and PPSF-SMF splices contributes up to 1.5 dB loss each, while it can be further optimized to <0.5 dB. And the pump suppression filters bring in another 4 dB loss, which can be reduced by using better components. Last but not least, because of the weak group birefringence, it is possible and also convenient to cascade several PPSFs to increase spectral brightness of the source without losing its broadband spectral property. Connecting multiple PPSFs to the output of the pump can increase the brightness of the source.

It will be appreciated by one skilled in the art that variants can exist in the above-described arrangements and applications. For example, the device is not limited to a specific wavelength range, but rather can be designed to operate any many spectral bands. The scope of the claims should not be limited by the preferred embodiments set forth in the examples, but should be given the broadest interpretation consistent with the description as a whole.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A polarization entangled photon pair source module comprising:
    a periodically poled silica fiber (PPSF) as a source for polarization entanglement;
    a pump to couple light into the PPSF using spontaneous parametric down conversion (SPDC) configured so that pump photons downconvert into signal and idler photons;
    one or more suppression filters following the fiber; and
    a spectral splitter to separate signal and idler photons following the one or more suppression filters.

2. The module of claim 1 wherein the one or more suppression filters are configured to eliminate photons of the pump as well as fluorescence noise photons.

3. The module of claim 1 wherein the PPSF is heated to stabilize the phase matching wavelength or alter the phase matching bandwidth dependent upon wavelength of the pump and quasi-phase matching period.

4. The module of claim 1 wherein the PPSF is weakly birefringent.

5. The module of claim 1 further comprising a connector key which is aligned to one polarization axes of the PPSF and is connected between the pump and the PPSF.

6. The module of claim 1 wherein the PPSF has large second-order nonlinearity such that $\chi(2) \approx 0.09$ pm/V.

7. The module of claim 1 wherein the pump is linearly polarized and has power within the phase-matching bandwidth.

8. The module of claim 7 wherein the pump is one of a laser diode, continuous wave, Qswitched, mode-locked, or a pulsed pump.

9. The module of claim 1 wherein the pump is a wavelength tunable laser capable of exciting other types of phase matching.

10. The module of claim 1 wherein the wavelength of the pump is preset to match the type-II peak of the PPSF.

11. The module of claim 1 further comprising multiple PPSFs that are connected to an output of the pump to increase brightness of the source.

12. The module of claim 1 further comprising a resonant cavity around the PPSF.

13. The module of claim 12 wherein the resonant cavity is formed by fiber gratings which are configured to provide feedback for stabilization of the pump wavelength.

14. The module of claim 1 wherein the pump is stabilized to about 0.1 nm.

15. The module of claim 1 wherein the PPSF is directly spliced to a single mode fiber pigtail of the one or more suppression filters.

16. The module of claim 15 wherein the one or more suppression filters provide more than 110 dB of suppression to the pump light.

17. The module of claim 1 wherein the pump is pigtailed to the PPSF.

18. The module of claim 1 further comprising a fibre Bragg grating at an output of the pump, wherein the Bragg grating provides the pump with an optical feedback within a specific spectral range, at which the pump wavelength stabilizes.

19. The module of claim 1 wherein the pump comprises a polarization-maintaining fiber and the PPSF has defined polarization axes which are aligned during splicing to the polarization-maintaining fiber of the pump.

* * * * *